United States Patent Office 2,739,889

Patented Mar. 27, 1956

2,739,889

PROCESS FOR FIXING LITHOGRAPHIC DIAZO-TYPE PRINTING FOILS HAVING BEEN EXPOSED TO LIGHT

Wilhelm Neugebauer, Wiesbaden-Biebrich, and Jakob Barthenheier, Eddersheim on Main, Germany, assignors, by mesne assignments, to Azoplate Corporation, Summit, N. J., a corporation of New Jersey No Drawing. Application December 3, 1951, Serial No. 259,712

Claims priority, application Germany December 8, 1950

9 Claims. (Cl. 95—5.4)

This invention relates to a new process of fixing photosensitive lithographic printing plates. More particularly, the invention pertains to fixing photosensitive foils provided with a light-sensitive layer free from hardenable colloid substances and sensitized by means of a specific group of diazo compounds. The plates are produced by exposing the photosensitive foils to light under a master and fixation of the exposed foils has the purpose of stabilizing the printing plates against the further influence of light.

The diazo compounds mentioned above are selected from the group consisting of: (1) the diazo compounds corresponding to the formula $$\begin{matrix} R \\ & \diagdown \\ & & N\text{—}Ar\text{—}N_2\text{—}X \\ & \diagup \\ R_1 \end{matrix}$$

wherein

X stands for an equivalent of an anion of an acid

Ar stands for an aromatic residue

R stands for a member of the group consisting of aryl, aralkyl and aroyl with the inclusion of the substituted members of either $R_1$ stands for a member of the group consisting of H, alkyl, aryl and aralkyl (2) condensates thereof with aldehydes, (3) sulfonates of (1), and (4) sulfonates of (2).

The co-pending patent application of Wilhelm Neugebauer and Jakob Barthenheier, Serial No. 70,802, now Patent Number 2,626,866, issued on January 27, 1953, filed January 13, 1949, describes a process for the fixation of this type of planographic and offset printing plates which have been produced by exposing the above characterized light-sensitive material to a light image. This may be accomplished by exposing to light under a master or by exposing to a projected image. The fixing effect is obtained by two essential steps. Subsequent to the exposure of the material to a light image, the exposed surface is coated with a layer of a water-soluble organic colloid substance by treating the surface of the material with an aqueous solution containing a water-soluble organic colloid substance and then subjected once more (with or without intermediate drying) to an exposure which this time is an overall uniform exposure of the entire surface (i. e., without using an original). The printing plates treated in this manner, when rubbed in with greasy ink in the presence of water, take greasy ink only at those areas that were struck by light during the first exposure under a master, while they do not take the greasy ink at the other areas. The latter areas have been rendered hydrophilic by the second exposure because they have been struck by light under the coating consisting of a water-soluble colloid substance.

It has now been found that the fixation can be effected also by first applying greasy ink and water to the surface of the foil immediately after it was exposed to light under a master (this can be done by swabbing the surface with ink after the surface has been sprayed with water, or by wetting a cotton swab with water and then placing some greasy ink on it and swabbing the surface, or by other analogous manual means, or in an offset printing machine using the inked rollers as will be readily understood by those skilled in the art) then subsequently applying a water-soluble coating of the type disclosed in the copending application referred to above and reexposing the foil (with or without intermediate drying) without a master. Printing plates are obtained that are insensitive to further action of light and they take greasy ink only at the places affected by light during the first exposure. The practical results achieved by this working procedure frequently are especially good.

The following examples are inserted in order to illustrate the present invention:

(1) A superficially saponified foil of cellulose acetate is coated with a 3% aqueous solution of the zinc chloride double salt of the diazo compound obtained from 1 mole of p-diazo-diphenylamine and 1 mole of paraformaldehyde by their condensation in sulfuric acid of 60° Bé. and is then dried after the excess solution has been wiped off. The foil is exposed under a negative master and subsequently is rubbed in with greasy ink in the presence of water. The areas of the foil struck by light accept the greasy printing ink. The application of the greasy printing ink can be performed also in an offset printing machine. Due to the presence of the light-sensitive diazo compound at the places that were not struck light, the foil is still light-sensitive at this stage. Consequently it tends to take greasy ink also at the places that were not struck by light during its exposure under the master when it is exposed to the action of light subsequent to the application of the ink. In order to fix the printing plate permanently and render it insensitive to the action of light, the foil is wiped over with an 8% aqueous solution of dextrine and is reexposed without a pattern; the diazo compound still present is thereby decomposed, but forms hydrophilic products not hydrophobic oleophilic decomposition products. After the dextrine has been washed off, the foil can be used for printing.

The foil is now insensitive to further action of light. In place of the dextrine solution, solutions of other water-soluble colloids may be used, such as, for example, solutions of gum arabic, of polyvinyl alcohol, of methylcellulose, preferably with low viscosity, of salts of carboxy-methylcellulose, of sodium alginate, of polyvinylpyrrolidone, of pectin, of a water-soluble urea-formaldehyde resin, of guar resin, of peptone of albumin, etc.

(2) A superficially saponified acetyl-cellulose foil is rubbed in with a 6% aqueous solution of the sulfate of the diazo compound derived from 4-amino-N-2′,6′-dichlorobenzylaniline which still contains 5% glycerine, and is then dried. Subsequent to its exposure under a negative, the layer side of the foil is rubbed in with greasy ink in the presence of water and wiped over with an 8% aqueous dextrine solution, then it is dried and reexposed without a master. The dextrine is washed off with water and the foil is clamped to an offset printing machine. It is only ink receptive at areas that were struck by light during the exposure under the master and at areas to which the dextrine solution was not applied. On the other hand, at the unexposed areas that were coated with the dextrine solution during the reexposure, it bears water and expels greasy printing ink.

(3) A parchment paper foil backed with a cardboard base is evenly coated with a 3% aqueous solution of the condensation product prepared from 1 mol of p-diazo-diphenylamine and 1 mol of formaldehyde in sulphuric acid of 60° Bé. and is dried thereafter with hot air.

The light-sensitive layer is exposed to light for 1 minute under a negative master, e. g. with the aid of an 18 ampere arc lamp at a distance of 70 cm., the exposed material is then rinsed with water and the surface of the layer is rubbed in with greasy ink. A positive image is obtained which is wiped over with a 20% aqueous solution of gum arabic and is dried thereafter with hot air. Then the inked surface is reexposed to light without a master for 1 minute (18 ampere arc lamp, distance: 70 cm.), rinsed with water and the foil is then mounted on an offset printing machine. It yields clear prints on a clear background.

If aqueous solutions of the other substances, mentioned on page 5 of the copending patent application Ser. No. 70,802, now Patent Number 2,626,866, issued on January 27, 1953, are used instead of gum arabic and otherwise the process is the same as described above, foils are obtained which also yield clear prints after the second exposure to light.

(4) The process is the same as described in Example 3 but instead of the diazo compound used in Example 3 the sulphate of the diazo compound of 4-amino-N-(2,6-dichlorobenzyl)-aniline is used. The result is the same as in Example 3.

(5) A paper foil manufactured according to U. S. Patent 2,534,588 and sold commercially in the United States is sensitized with a 3% aqueous solution of the sulphonate of the condensation product prepared from 1 mol of diazo-diphenylamine and 1 mol of formaldehyde in sulphuric acid of 60° Bé. and the layer is dried thereafter with hot air. The dry layer is then exposed to light for 5 minutes under a negative master with the aid of an 18 ampere arc lamp at a distance of 70 cm. The layer is wiped over with a 5% aqueous solution of primary ammonium phosphate and then the exposed layer is rubbed in with greasy ink. A positive image is obtained. Then the image is wiped over with a 10% aqueous solution of polyvinyl alcohol of medium viscosity and the whole foil is reexposed without a master for 5 minutes with the aid of an arc lamp of 18 amperes current at a distance of 70 cm. Printing in an offset printing machine yields good prints on a clear background.

Having now described and disclosed the present invention, what we claim is:

1. In a process for making a lithographic printing material from photosensitive material sensitized with a light-sensitive diazo compound selected from the group consisting of: (1) the diazo compounds corresponding to the formula

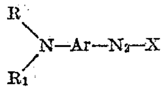

wherein

X stands for an equivalent of an anion of an acid
Ar stands for an aromatic residue
R stands for a member of the group consisting of aryl, aralkyl, and aroyl with the inclusion of the substituted members of either
$R_1$ stands for a member of the group consisting of H, alkyl, aryl and aralkyl (2) condensates thereof with aldehydes, (3) sulfonates of (1), and (4) sulfonates of (2), by exposing the photosensitive surface of said material to light through an original, the fixing method comprising the steps of first applying greasy ink and water to said light exposed surface, subsequently treating the inked surface with an aqueous solution containing a water-soluble organic colloid substance to coat the exposed and inked surface of said material with a layer of said water-soluble colloid substance and then subjecting said coated material to an overall exposure to light whereby said material will no longer be capable of being affected by light but upon removal of said water-soluble colloid substance said material will be capable of functioning as a lithographic printing plate.

2. In a process for making a lithographic printing material from photosensitive material sensitized with a light-sensitive diazo compound which upon exposure to light decomposes into a greasy ink-receptive substance, by exposing the photosensitive surface of said material to light through an original, the fixing method comprising the steps of first applying greasy ink and water to said light exposed surface, subsequently treating the inked surface with an aqueous solution containing a water soluble organic colloid substance to coat said exposed and inked surface of said material with a layer of said water-soluble colloid substance and then subjecting said coated material to an overall exposure to light, whereby said material will no longer be capable of being affected by light but upon removal of said water-soluble colloid substance said material will be capable of functioning as a lithographic printing plate.

3. In a process for making a lithographic printing material from a photosensitive material sensitized with a light-sensitive diazo compound which upon exposure to light decomposes into a greasy ink receptive substance, by exposing the photosensitive surface of said material to light through an original, the fixing method comprising the steps of first applying greasy ink and water to said light exposed surface, subsequently treating the inked surface with an aqueous solution containing a water-soluble colloid substance selected from the group consisting of dextrine, gum arabic, cellulose ethers, polyuronic acids, and the salts thereof, polyvinyl alcohol, polyvinyl pyrrolidones, water-soluble urea resins, proteins, polyethylene-oxide, pectin, sodium alginate, mesquite gum and guar resin, to coat said exposed and inked surface of said material with a layer of said water-soluble colloid substance and then subjecting said coated material to an overall exposure to light, whereby said material will no longer be capable of being affected by light but upon removal of said water-soluble colloid substance said material will be capable of functioning as a lithographic printing plate.

4. In a process for making a lithographic printing material, from photosensitive material sensitized with a light-sensitive diazo compound which upon exposure to light decomposes into a greasy ink-receptive substance, by exposing the photosensitive surface of said material to light through an original, the fixing method comprising the steps of first applying greasy ink and water to said light exposed surface, subsequently treating the inked surface with an aqueous dextrine solution to coat said exposed and inked surface of said material with a layer of dextrine, and then subjecting said coated material to an overall exposure to light, whereby said material will no longer be capable of being affected by light but upon removal of said dextrine layer said material layer will be capable of functioning as a lithographic printing plate.

5. In a process for making a lithographic printing material, from a photosensitive foil sensitized with a light-sensitive diazo compound which upon exposure to light decomposes into a greasy ink-receptive substance, by exposing the photosensitive surface of said material to light through an original, the fixing method comprising the steps of first applying greasy ink and water to said light exposed surface, subsequently treating the inked surface with an aqueous protein solution to coat said exposed and inked surface of said material with a layer of protein, and then subjecting said coated material to an overall exposure to light, whereby said material will no longer be capable of being affected by light but upon removal of said protein layer said material will be capable of functioning as a lithographic printing plate.

6. In a process for making a lithographic printing material from a photosensitive material sensitized with a light-sensitive diazo compound which upon exposure to light decomposes into a greasy ink-receptive substance, by exposing the photosensitive surface of said material to light through an original, the fixing method comprising the steps of first applying greasy ink and water to said light exposed surface, subsequently treating the inked surface with an aqueous solution of colloidal gum to coat said exposed and inked surface of said material with a layer of colloidal gum, and then subjecting said coated material to an overall exposure to right, whereby said material will no longer be capable of being affected by light but upon removal of said water-soluble colloid gum layer said material will be capable of functioning as a lithographic printing plate.

7. In a process for making a lithographic printing material from a photosensitive material sensitized with a light-sensitive diazo compound which upon exposure to light decomposes into a greasy ink-receptive substance, by exposing the photosensitive surface of said material to light through an original, the fixing method comprising the steps of first applying greasy ink and water to said light exposed surface, subequently treating the inked surface with an aqueous gum arabic solution to coat said exposed and inked surface of said material with a layer of gum arabic, and then subjecting said coated material to an overall exposure to light, whereby said material will no longer be capable of being affected by light but upon removal of said gum arabic layer said material will be capable of functioning as a lithographic printing plate.

8. In a process for making a lithographic printing material from a photosensitive material sensitized with a light-sensitive diazo compound which upon exposure to light decomposes into a greasy ink-receptive substance, by exposing the photosensitive surface of said material to light through an original, the fixing method comprising the steps of first applying greasy ink and water to said exposed surface, subsequently treating the linked surface with an aqueous mesquite gum solution to coat said exposed and inked surface of said material with a layer of mesquite gum and then subjecting said coated material to an overall exposure to light, whereby said material will no longer be capable of being affected by light but upon removal of said mesquite gum layer said material will be capable of functioning as a lithographic printing plate.

9. In a process for making lithographic printing material from a photosensitive material sensitized with a light-sensitive diazo compound which upon exposure to light decomposes into a greasy ink-receptive substance, by exposing the photosensitive surface of said material to light through an original, the fixing method comprising the steps of first applying greasy ink and water to said light exposed surface, subsequently treating the inked surface with an aqueous solution of guar resin to coat said exposed and inked surface of said material with a layer of guar resin, and then subjecting said coated material to an overall exposure to light, whereby said material will no longer be capable of being affected by light but upon removal of said guar resin layer said material will be capable of functioning as a lithographic printing plate.

References Cited in the file of this patent

UNITED STATES PATENTS

| | | |
|---|---|---|
| 2,311,889 | Toland et al. | Feb. 23, 1943 |
| 2,313,848 | Toland et al. | Mar. 16, 1943 |
| 2,448,861 | Colt | Sept. 7, 1948 |
| 2,568,503 | Kenyon et al. | Sept. 18, 1951 |
| 2,626,866 | Neugebauer et al. | Jan. 27, 1953 |